United States Patent
Huang

(10) Patent No.: US 7,292,406 B1
(45) Date of Patent: Nov. 6, 2007

(54) DISK DRIVE INCLUDING A SPINDLE MOTOR AND A PIVOT BEARING CARTRIDGE ATTACHED TO DIFFERENT LAYERS OF A LAMINATED COVER

(75) Inventor: Yao-Hsin Huang, Santa Clara, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 502 days.

(21) Appl. No.: 10/837,471

(22) Filed: Apr. 30, 2004

(51) Int. Cl.
*G11B 33/08* (2006.01)
(52) U.S. Cl. .................................. 360/97.02
(58) Field of Classification Search ............ 360/97.01, 360/97.02, 97.03
See application file for complete search history.

(56) References Cited

U.S. PATENT DOCUMENTS

| | | | | |
|---|---|---|---|---|
| 5,214,549 A * | 5/1993 | Baker et al. | ............. | 360/97.02 |
| 5,666,239 A * | 9/1997 | Pottebaum | ............. | 360/97.03 |
| 5,691,037 A * | 11/1997 | McCutcheon et al. | ...... | 428/172 |
| 5,781,373 A * | 7/1998 | Larson et al. | ............ | 360/97.02 |
| 6,177,173 B1 * | 1/2001 | Nelson | ........................ | 428/137 |
| 6,504,672 B1 * | 1/2003 | Janik et al. | .............. | 360/97.02 |
| 6,525,931 B2 * | 2/2003 | Yagenji et al. | .............. | 361/685 |
| 6,529,345 B1 * | 3/2003 | Butler et al. | ............. | 360/97.01 |
| 6,621,658 B1 * | 9/2003 | Nashif | ..................... | 360/97.02 |
| 6,950,275 B1 * | 9/2005 | Ali et al. | ................. | 360/97.02 |
| 6,958,884 B1 * | 10/2005 | Ojeda et al. | ............. | 360/97.02 |
| 2001/0029525 A1 * | 10/2001 | Lahr | ......................... | 709/218 |
| 2002/0001155 A1 * | 1/2002 | Takahashi et al. | ....... | 360/97.01 |
| 2005/0094311 A1 * | 5/2005 | Boss et al. | ................ | 360/97.01 |

FOREIGN PATENT DOCUMENTS

| JP | 05258545 A | * | 10/1993 |
|---|---|---|---|
| JP | 10144069 A | * | 5/1998 |
| JP | 11053868 A | * | 2/1999 |

OTHER PUBLICATIONS

"Screw Hole Sealing by Tri-laminate Top Cover," Dec. 1, 2000, IBM technical Disclosure Bulletin, Iss. No. 440, p. 2236.*

* cited by examiner

*Primary Examiner*—William J Klimowicz
(74) *Attorney, Agent, or Firm*—Joshua C. Harrison, Esq.

(57) ABSTRACT

A disk drive includes a spindle motor, a pivot bearing cartridge, and a laminated cover. The laminated cover includes a first cover layer attached to the spindle motor, and a second cover layer attached to the pivot bearing cartridge. The cover further includes a damping layer disposed between the first and second cover layers for mechanically insulating the spindle motor and the pivot bearing cartridge from each other to mitigate vibration through the cover.

16 Claims, 4 Drawing Sheets

DISK DRIVE INCLUDING A SPINDLE MOTOR AND A PIVOT BEARING CARTRIDGE ATTACHED TO DIFFERENT LAYERS OF A LAMINATED COVER

BACKGROUND OF THE INVENTION

1. Field of the Invention

The present invention relates generally to disk drives, and in particular to a disk drive including a spindle motor and a pivot bearing cartridge attached to different layers of a laminated cover.

2. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA) that includes a transducer head supported by a slider for reading and writing data from and to the disk.

The spindle motor includes a spindle motor hub that is rotatably attached to the disk drive base. The spindle motor hub has an outer hub flange that supports a lowermost one of the disks. Additional disks may be stacked and separated with annular disk spacers that are disposed about the spindle motor hub. The spindle motor typically includes a spindle motor base that is attached to the disk drive base. A shaft is coupled to the spindle motor base and the spindle motor hub surrounds the shaft. The spindle motor hub may be rotatably coupled to the shaft and therefore the spindle motor base typically via a pair of bearing sets. A stator is positioned about the shaft and is attached to the spindle motor base. A magnet element is attached to the hub flange. The stator with the various poles of the magnet element. Such interaction results in forces applied to the spindle motor hub that tend to rotate the spindle motor hub and the attached disks.

The head stack assembly includes an actuator assembly including the sliders and a flex circuit cable assembly attached to the actuator assembly. A conventional "rotary" actuator assembly (also referred to as "rotary actuator" or simply "actuator") typically comprises an actuator body, a pivot bearing cartridge, a coil portion that extends from one side of the actuator body to interact with one or more permanent magnets to form a voice coil motor, and one or more actuator arms which extend from an opposite side of the actuator body to a distal end of the actuator assembly. The actuator body includes a bore and the pivot bearing cartridge engaged within the bore for allowing the actuator body to rotate between limited positions. At least one head gimbal assembly (HGA) is distally attached to each of the actuator arms. Each head gimbal assembly biases a head towards the disk.

The printed circuit board assembly includes a servo control system in the form of a disk controller for generating servo control signals. The head stack assembly is controllably positioned in response to the generated servo control signals from the disk controller to the voice coil motor. In so doing, the attached sliders are moved relative to tracks disposed upon the disk for reading and writing operations with respect to the tracks contained on the disks.

A plurality of fasteners, such as metal screws, are disposed about a periphery of the disk drive cover and engage the periphery of the disk drive base for attachment of the disk drive cover with the disk drive base. In addition, as support for the actuator, a fastener is used to support the spindle motor and is engaged to the spindle motor also through the disk drive cover.

A topic of concern is mitigating the effects of various vibrations within the disk drive due to the many dynamic components. Accordingly, there is a need for an improved disk drive configuration in comparison to the prior art.

SUMMARY OF THE INVENTION

According to an aspect of the present invention, there is provided a disk drive. The disk drive includes a spindle motor, a pivot bearing cartridge, and a laminated cover. The laminated cover includes a first cover layer attached to the spindle motor, and a second cover layer attached to the pivot bearing cartridge. The cover further includes a damping layer disposed between the first and second cover layers for mechanically insulating the spindle motor and the pivot bearing cartridge from each other to mitigate vibration through the cover.

According to various embodiments, the first cover layer is disposed in mechanical communication with the disk drive base via the damping layer and the second cover layer with the second cover layer attached to the disk drive base. In another embodiment, the second cover layer is disposed in mechanical communication with the disk drive base via the damping layer and the first cover layer with the first cover layer attached to the disk drive base. The first cover layer may be disposed between the second cover layer and the disk drive base. In another embodiment, the second cover layer may be disposed between the first cover layer and the disk drive base.

The spindle motor may include a spindle motor shaft, and the first cover layer may be attached to the spindle motor shaft. The pivot bearing cartridge may include a pivot bearing cartridge shaft, and the second cover layer may be attached to the pivot bearing cartridge shaft. The first cover layer may be attached to the spindle motor with a fastener. The second cover layer may be attached to the pivot bearing cartridge with a fastener.

The first cover layer may include a first cover layer fastener engagement hole and a first cover layer opening. The second cover layer may include a second cover layer fastener engagement hole and a second cover layer opening. The first cover layer fastener engagement hole is aligned with the second cover layer opening, and the second cover layer fastener engagement hole is aligned with the first cover layer opening. The first cover layer is attached to the spindle motor with a fastener engaged at the first cover layer engagement hole, and the second cover layer is attached to the pivot bearing cartridge with a fastener engaged at the second cover layer engagement hole.

Further, the first cover layer may be formed of a metal material, such as a stainless steel material or an aluminum material. Likewise, the second cover layer may be formed of a metal material, such as a stainless steel material or an aluminum material. The damping layer may be formed of a viscoelastic material.

DESCRIPTION OF THE PREFERRED EMBODIMENTS

Figure 1:
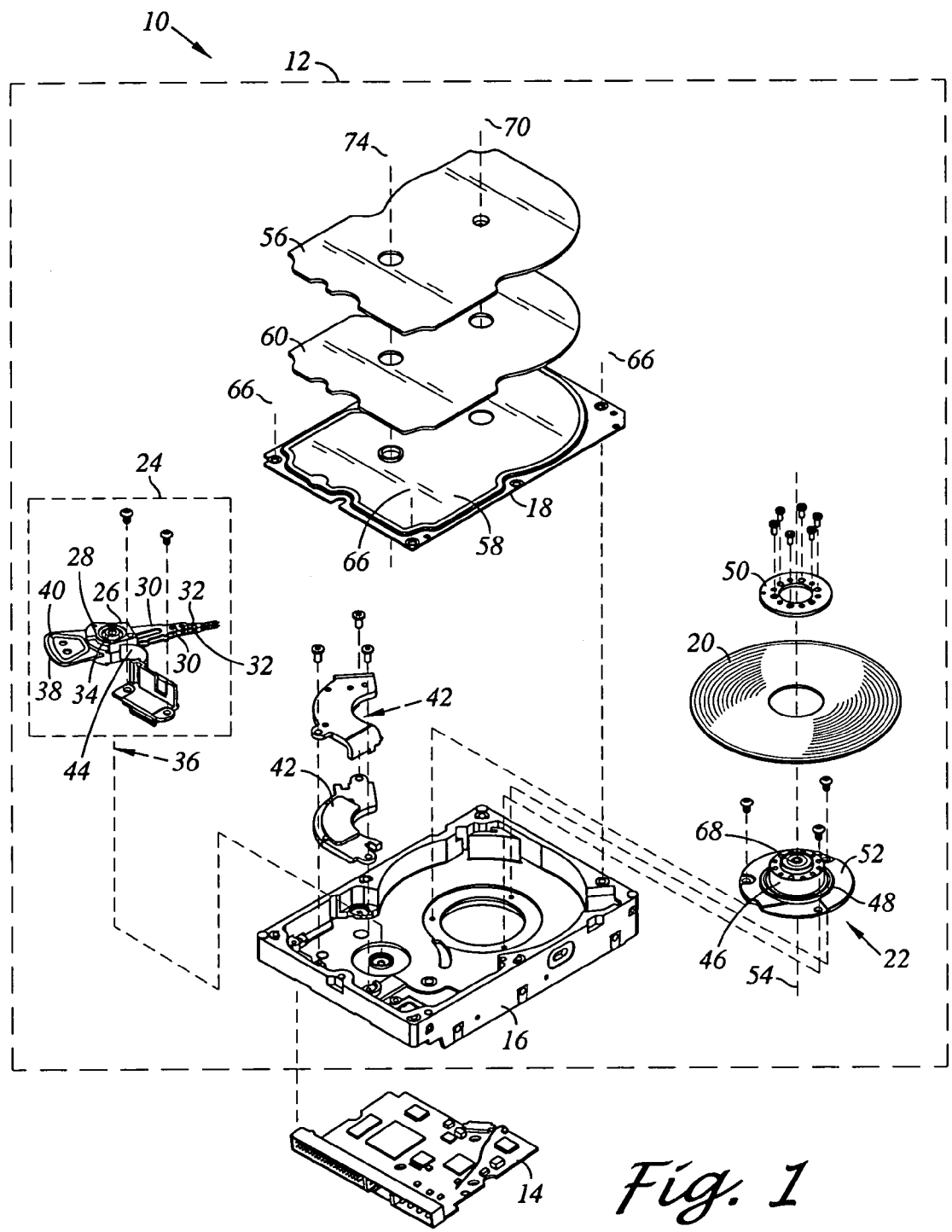
FIG. 1 is an exploded perspective view of a disk drive in accordance with an aspect of the present invention.

Referring now to the drawings wherein the showings are for purposes of illustrating preferred embodiments of the present invention only, and not for purposes of limiting the same, FIGS. 1-9 illustrate a disk drive in accordance with aspects of the present invention.

Referring now to the drawings wherein the showings are for purposes of illustrating preferred embodiments of the present invention only, and not for purposes of limiting the same, FIGS. 1-9 illustrate a disk drive including a laminated cover in accordance with aspects of the present invention.

Referring now to FIG. 1, there is depicted an exploded perspective view of a disk drive 10 as constructed in accordance with an aspect of the present invention. The disk drive 10 includes a head disk assembly (HDA) 12 and a printed circuit board assembly (PCBA) 14. The head disk assembly 12 includes disk drive base 16 and a laminated cover 18 that collectively house at least one magnetic disk 20. The disk 20 contains a plurality of tracks for storing data. The head disk assembly 12 further includes a spindle motor 22 for rotating the disk 20. The head disk assembly 12 further includes a head stack assembly 24 rotatably attached to the disk drive base 16 in operable communication with the disk 20. The head stack assembly 24 includes a rotary actuator 26.

The actuator 26 includes an actuator body 28 and actuator arms 30 that extend from the actuator body 28. Distally attached to the actuator arms 30 are head gimbal assemblies 32. Though not shown in detail, the head gimbal assemblies 32 each includes a slider having a transducer head which is configured to read and write data from and to the disk 20.

The actuator body 28 includes a bore, and the actuator 26 further includes a pivot bearing cartridge 34 engaged within the bore for facilitating the actuator body 28 to rotate between limited positions about an axis of rotation 36. The actuator 26 further includes a coil support 38 that extends from one side of the actuator body 28 opposite the actuator arms 30. The coil support 38 is configured to support an actuator coil 40.

A pair of magnetic elements 42 is supported by mounts which are attached to the disk drive base 16. The coil 40 interacts with the magnetic elements 42 to form a voice coil motor for controllably rotating the actuator 26.

The head stack assembly 24 further includes a flex cable assembly 44 disposed in electrical communication with the printed circuit board 14. The flex cable assembly 44 supplies current to the actuator coil 40 and carries signals between the transducer heads and the printed circuit board assembly 14.

The spindle motor 22 includes a spindle motor hub 46 that is rotatably coupled to the disk drive base 16. The spindle motor hub 46 has an outer hub flange 48 that supports the disk 20. Additional disks 20 may be stacked and separated with annular disk spacers that are disposed about the spindle motor hub 46. A disk clamp 50 is provided to secure the disk 20 to the spindle motor hub 46. The spindle motor hub 46 may further include a spindle motor base 52 that is attached to the disk drive base 16. The spindle motor hub 46 is configured to rotate with respect to the spindle motor base 52 about a spindle motor axis 54.

Figure 3:
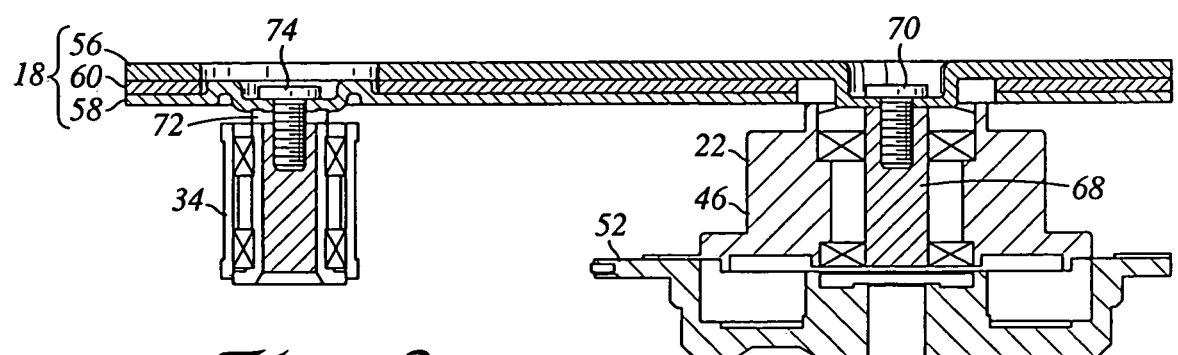
FIG. 3 is a side view of a portion of the laminated cover as shown assembled with the spindle motor and the pivot bearing cartridge of FIG. 1.
Figure 4:
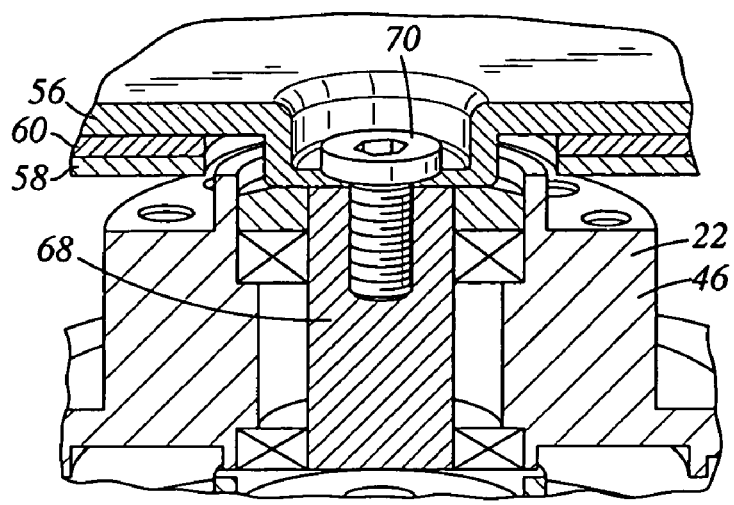
FIG. 4 is an enlarged cross sectional side perspective view of a portion of the laminated cover as shown assembled with the spindle motor.
Figure 5:
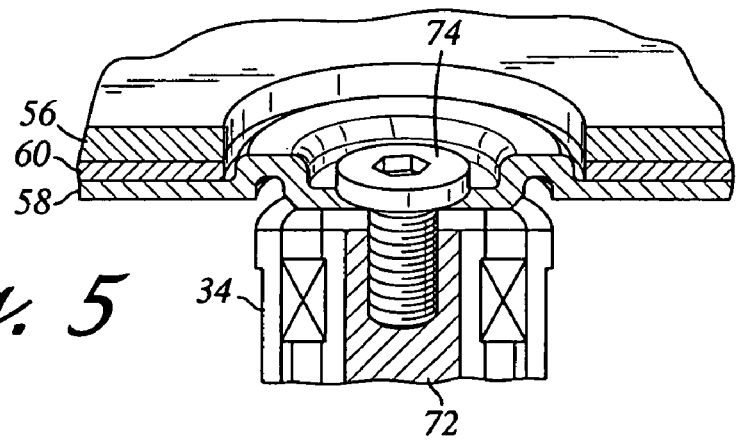
FIG. 5 is an enlarged cross sectional side perspective view of a portion of the laminated cover as shown assembled with the pivot bearing cartridge.

According to an aspect of the present invention, there is provided the disk drive 10. The disk drive 10 includes the spindle motor 22, the pivot bearing cartridge 34, and the laminated cover 18. FIG. 3 is a side view of a portion of the laminated cover 18 as shown assembled with the spindle motor 22 and the pivot bearing cartridge 34 of FIG. 1. FIG. 4 is an enlarged cross sectional side perspective view of a portion of the laminated cover 18 as shown assembled with the spindle motor 22, and FIG. 5 is an enlarged cross sectional side perspective view of a portion of the laminated cover 18 as shown assembled with the pivot bearing cartridge 34. The laminated cover 18 includes a first cover layer 56 attached to the spindle motor 22, and a second cover layer 58 attached to the pivot bearing cartridge 34. The cover 18 further includes a damping layer 60 disposed between the first and second cover layers 56, 58 for mechanically insulating the spindle motor 22 and the pivot bearing cartridge 34 from each other to mitigate vibration through the cover 18.

Figure 6:
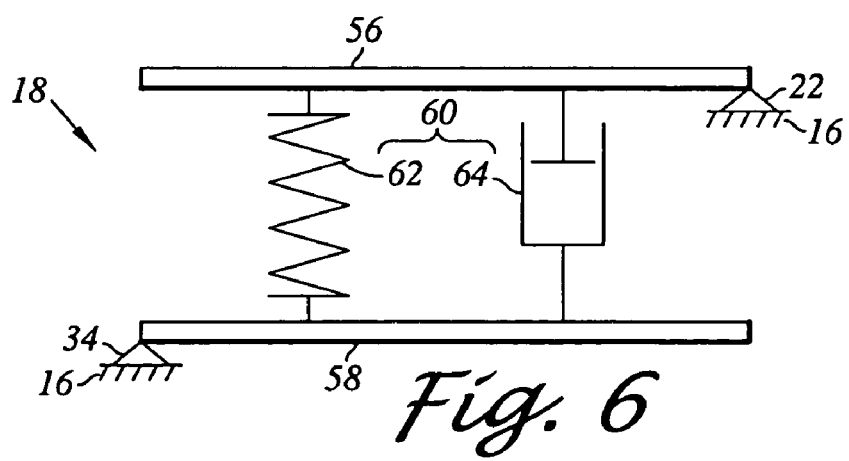
FIG. 6 is a mechanical schematic diagram of the laminated cover, the spindle motor, the pivot bearing cartridge, and the disk drive base.

The damping layer 60 being disposed between the first and second cover layer 56, 58 refers to the first and second cover layers 56, 58 being coupled to each other via the damping layer 60. Thus, the first and second cover layers 56, 58 are not directly attached to each other. FIG. 6 is a mechanical schematic diagram of the laminated cover 18, the spindle motor 22, the pivot bearing cartridge 34, and the disk drive base 16. The damping layer 60 is symbolically represented as a spring element 62 and a damper element 64. The spring element 62 and the damper element 64 are interposed between the first and second cover elements 56, 58. As such, with respect to the cover 18, the spindle motor 22 and the pivot bearing cartridge 34 are mechanically insulated with the damping layer 60. Such interposition of the damping layer 60 is contemplated to mitigate vibration of the cover 18.

The first and second cover layers 56, 58 may be formed of a metal material, such as a stainless steel material or an aluminum material. The first and second cover layers 56, 58 may be formed according to any of those methods which are well known to one of ordinary skill in the art such as being stamped. In addition, the first and second cover layers 56, 58 may be coated or painted. The damping layer 60 is contemplated to have damping properties which are greater than those of the first and second cover layer 56, 58, and may be formed of materials which are well known to one of ordinary skill in the art. In this regard, the damping layer 60 may be formed of a viscoelastic material. Other materials may include foam or rubber for examples.

In the embodiment represented in FIGS. 1-6, the second cover layer 58 may be disposed between the first cover layer 56 and the disk drive base 16. The first cover layer 56 is disposed in mechanical communication with the disk drive base 16 via the damping layer 60 and the second cover layer 58. The second cover layer is attached to the disk drive base 16. A plurality of fasteners 66 may be used to attach the second cover layer 58 to the disk drive base 16.

The spindle motor 22 includes a spindle motor shaft 68. The first cover layer 56 is attached to the spindle motor shaft 68 with a fastener 70. Though not shown, other intermediate components such as a washer may be utilized with the fastener 70. The spindle motor hub 46 is configured to rotate with respect to the spindle motor shaft 68. Although a fixed shaft is depicted, it is contemplated that other configurations and bearing arrangements for allowing the spindle motor hub 46 to rotate may be used. In addition, the pivot bearing cartridge 34 includes a pivot bearing cartridge shaft 72. The second cover layer 58 is attached to the pivot bearing cartridge shaft 72 with a fastener 74. Though not shown, other intermediate components such as a washer may be utilized with the fastener 74.

Figure 2:
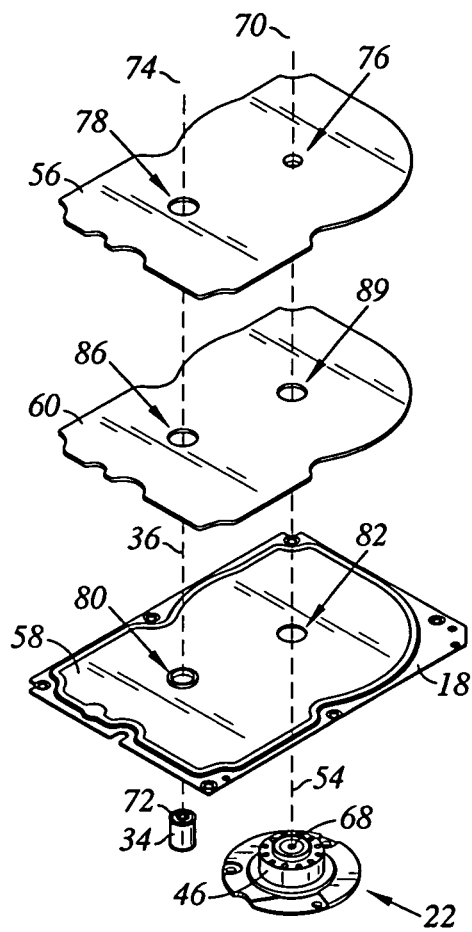
FIG. 2 is an enlarged exploded perspective view of the laminated cover, the spindle motor and the pivot bearing cartridge of FIG. 1.

As best shown in FIG. 2, the first cover layer 56 may include a first cover layer fastener engagement hole 76 and a first cover layer opening 78. The second cover layer 58 may include a second cover layer fastener engagement hole 80 and a second cover layer opening 82. Further, the damping layer 60 may include damping layer first opening 89 and a damping layer second opening 86. The first cover layer fastener engagement hole 76, the damping layer first opening 89, and the second cover layer opening 82 may be aligned as shown. Similarly, the second cover layer fastener engagement hole 80, the damping layer second opening 86, and the first cover layer opening 78 may be aligned as shown. The first cover layer 56 is attached to the spindle motor 22 with the fastener 70 engaged at the first cover layer engagement hole 76. The second cover layer 58 is attached to the pivot bearing cartridge 34 with the fastener 74 engaged at the second cover layer engagement hole 80.

Figure 7:
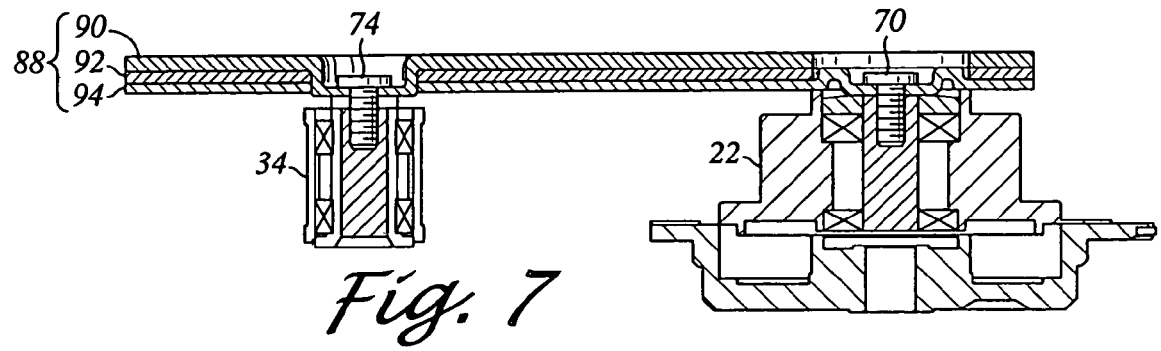
FIG. 7 is a side view of a portion of the laminated cover as shown assembled with the spindle motor and the pivot bearing cartridge similar to that of FIG. 7, however, according to another embodiment.
Figure 8:
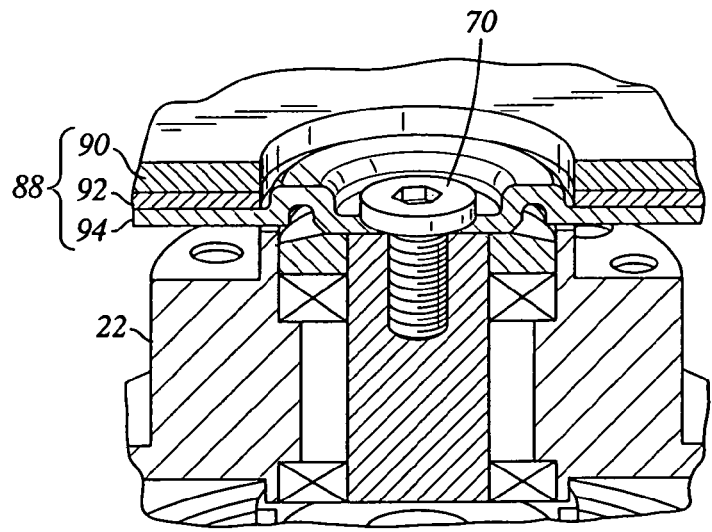
FIG. 8 is an enlarged cross sectional side perspective view of a portion of the laminated cover as shown assembled with the spindle motor of FIG. 7.
Figure 9:
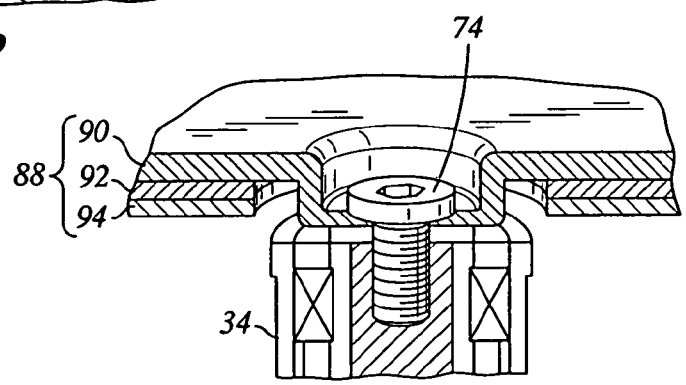
FIG. 9 is an enlarged cross sectional side perspective view of a portion of the laminated cover as shown assembled with the pivot bearing cartridge of FIG. 7.

Referring now to FIGS. 7-9, there is depicted another embodiment of the present invention. In this embodiment there is provided the laminated cover 88 that includes a first cover layer 90, a damping layer 92 and a second cover layer 94 which are similar to the first cover layer 56, the damping layer 92, and the second cover layer 58 except for the differences noted below. The first cover layer 90 is attached to pivot bearing cartridge 34. The second cover layer 94 is disposed between the damping layer 92 and the disk drive base 16. In this regard, the second cover layer 94 is attached it the spindle motor 22 and the disk drive base 16. As such, in this embodiment the top layer, the first cover layer 90, is attached to the pivot bearing cartridge 34, while the bottom layer, the second cover layer 94, is attached to the spindle motor 22.

I claim:

1. A disk drive comprising:
    a spindle motor;
    a pivot bearing cartridge; and
    a laminated cover including:
        a first cover layer attached to the spindle motor by a first fastener;
        a second cover layer attached to the pivot bearing cartridge by a second fastener; and
        a damping layer disposed between the first and second cover layers;
        the first fastener being in contact with the first cover layer but not in contact with the second cover layer; and
        the second fastener being in contact with the second cover layer but not in contact with the first cover layer.

2. The disk drive of claim 1 wherein the first cover layer is disposed in mechanical communication with a disk drive base via the damping layer and the second cover layer, the second cover layer is attached to the disk drive base, and the first cover layer is not in contact with the disk drive base.

3. The disk drive of claim 1 wherein the second cover layer is disposed in mechanical communication with a disk drive base via the damping layer and the first cover layer, the first cover layer is attached to the disk drive base, and the second cover layer is not in contact with the disk drive base.

4. The disk drive of claim 1 wherein the first cover layer is disposed between the second cover layer and a disk drive base.

5. The disk drive of claim 1 wherein the second cover layer is disposed between the first cover layer and a disk drive base.

6. The disk drive of claim 1 wherein the spindle motor includes a spindle motor shaft, the first cover layer is attached to the spindle motor shaft, and the second cover layer is not in contact with the spindle motor shaft.

7. The disk drive of claim 1 wherein the pivot bearing cartridge includes a pivot bearing cartridge shaft, the second cover layer is attached to the pivot bearing cartridge shaft, and the first cover layer is not in contact with the pivot bearing cartridge shaft.

8. The disk drive of claim 1 wherein the first cover layer includes a first cover layer fastener engagement hole and a first cover layer opening, the second cover layer includes a second cover layer fastener engagement hole and a second cover layer opening, the first cover layer fastener engagement hole is aligned with the second cover layer opening, the second cover layer fastener engagement hole is aligned with the first cover layer opening, the first cover layer opening having a larger diameter than the second cover layer fastener engagement hole, and the second cover layer opening having a larger diameter than the first cover layer fastener engagement hole.

9. The disk drive of claim 8 wherein the first cover layer opening has a larger diameter than a greatest diameter of the second fastener and the second cover layer opening has a larger diameter than a greatest diameter of the first fastener.

10. The disk drive of claim 1 wherein the first fastener includes a washer.

11. The disk drive of claim 10 wherein the first cover layer is formed of a stainless steel material.

12. The disk drive of claim 10 wherein the first cover layer is formed of an aluminum material.

13. The disk drive of claim 1 wherein the second fastener includes a washer.

14. The disk drive of claim 13 wherein the second cover layer is formed of a stainless steel material.

15. The disk drive of claim 13 wherein the second cover layer is formed of an aluminum material.

16. The disk drive of claim 1 wherein the damping layer is formed of a viscoelastic material.

* * * * *